US008428777B1

(12) United States Patent
Poursohi et al.

(10) Patent No.: US 8,428,777 B1
(45) Date of Patent: Apr. 23, 2013

(54) METHODS AND SYSTEMS FOR DISTRIBUTING TASKS AMONG ROBOTIC DEVICES

(75) Inventors: Arshan Poursohi, Berkeley, CA (US); James Kuffner, Moutain View, CA (US); Anthony Francis, San Jose, CA (US); Ryan Hickman, Mountain View, CA (US)

(73) Assignee: Google Inc., Moutain View, CA (US)

( * ) Notice: Subject to any disclaimer, the term of this patent is extended or adjusted under 35 U.S.C. 154(b) by 0 days.

(21) Appl. No.: 13/564,135

(22) Filed: Aug. 1, 2012

Related U.S. Application Data

(60) Provisional application No. 61/595,930, filed on Feb. 7, 2012.

(51) Int. Cl.
*G05B 19/418* (2006.01)
*G05B 19/04* (2006.01)

(52) U.S. Cl.
USPC .............. 700/248; 700/247; 700/249; 701/48

(58) Field of Classification Search .................. None
See application file for complete search history.

(56) References Cited

U.S. PATENT DOCUMENTS

| | | | |
|---|---|---|---|
| 5,757,640 A * | 5/1998 | Monson | 700/2 |
| 5,825,981 A * | 10/1998 | Matsuda | 700/248 |
| 6,374,155 B1 * | 4/2002 | Wallach et al. | 700/245 |
| 7,343,222 B2 | 3/2008 | Solomon | |
| 7,765,028 B2 * | 7/2010 | Orita | 700/248 |
| 2003/0083777 A1 * | 5/2003 | Ostwald et al. | 700/218 |
| 2004/0024490 A1 * | 2/2004 | McLurkin et al. | 700/245 |
| 2007/0152619 A1 * | 7/2007 | Sugiyama et al. | 318/568.12 |
| 2008/0098065 A1 | 4/2008 | Lee et al. | |
| 2010/0048242 A1 | 2/2010 | Rhoads et al. | |
| 2011/0143811 A1 | 6/2011 | Rodriguez | |
| 2012/0029688 A1 * | 2/2012 | Lager et al. | 700/230 |
| 2012/0150346 A1 * | 6/2012 | Wieland | 700/246 |

OTHER PUBLICATIONS

Albert, Robots With His Brain in The Cloud, http://www.upvery.com/82756-robots-with-his-brain-in-the-cloud.html, Apr. 22, 2011.

* cited by examiner

*Primary Examiner* — Khoi Tran
*Assistant Examiner* — Bao Long T Nguyen
(74) *Attorney, Agent, or Firm* — McDonnell Boehnen Hulbert & Berghoff LLP

(57) ABSTRACT

Methods and systems for distributing tasks among robotic devices are described. A server may receive from a first device, information associated with an assigned task of the first device. The server may determine whether the assigned task can be executed more efficiently with assistance from additional devices, and may further determine available devices that can assist in executing the assigned task. The determined available devices may be ranked according to an amount of usage of the devices over time, and a second device may be selected from the available devices based on the ranking. A subtask of the assigned task may then be determined from a plurality of subtasks of the assigned task based on capabilities of the selected second device. An instruction may then be sent to the second device, instructing the second device to execute the determined subtask.

22 Claims, 7 Drawing Sheets

METHODS AND SYSTEMS FOR DISTRIBUTING TASKS AMONG ROBOTIC DEVICES

CROSS-REFERENCE TO RELATED APPLICATION

The present application claims priority to U.S. Provisional Application Ser. No. 61/595,930, filed on Feb. 7, 2012, the entire contents of which are incorporated by reference.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software that collect commands from the user and interpret the commands into commands on the servers. The servers may handle the computing, and can either store or retrieve information from database servers or file servers and display an updated page to the user. Through "cloud computing", data across multiple servers can be synchronized around the world allowing for collaborative work on one file or project, from multiple users around the world, for example.

SUMMARY

This disclosure may disclose, inter alia, methods and systems for robot cloud computing.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of devices may be used or configured as means for performing functions of any of the methods described herein (or any portions of the methods described herein).

In one example, a method is provided that comprises receiving from a first device, information associated with an assigned task of the first device. The assigned task involves an interaction with an environment and comprises a plurality of subtasks. The method may also comprise determining whether the assigned task can be executed in less time with assistance from one or more additional devices, and determining one or more available devices that can assist in executing the assigned task by executing at least one of the plurality of subtasks. The one or more available devices include a device that is idle and that is configured to execute at least one of the plurality of subtasks. The method may further comprise ranking devices from the one or more available devices based on an amount of usage over time of the one or more available devices, selecting a second device from among the one or more available devices based on the ranking of the one or more available devices, determining a first subtask from the plurality of subtasks for the second device to execute based on capabilities of the second device, and sending to the second device instructions to execute the determined first subtask.

In another example, a computer readable memory with instructions stored thereon is provided. The instructions may be executable by a computing device to cause the computing device to execute functions. The functions comprise receiving from a first device, information associated with an assigned task of the first device. The assigned task involves an interaction with an environment and comprises a plurality of subtasks. The method may also comprise determining whether the assigned task can be executed in less time with assistance from one or more additional devices, and determining one or more available devices that can assist in executing the assigned task by executing at least one of the plurality of subtasks. The one or more available devices include a device that is idle and that is configured to execute at least one of the plurality of subtasks. The method may further comprise ranking devices from the one or more available devices based on an amount of usage over time of the one or more available devices, selecting a second device from among the one or more available devices based on the ranking of the one or more available devices, determining a first subtask from the plurality of subtasks for the second device to execute based on capabilities of the second device, and sending to the second device instructions to execute the determined first subtask.

In yet another example, a device is provided. The device includes a processor and memory. The memory includes instructions stored therein executable by the processor to perform functions. The functions comprise receiving from a first device, information associated with an assigned task of the first device. The assigned task involves an interaction with an environment and comprises a plurality of subtasks. The method may also comprise determining whether the assigned task can be executed in less time with assistance from one or more additional devices, and determining one or more available devices that can assist in executing the assigned task by executing at least one of the plurality of subtasks. The one or more available devices include a device that is idle and that is configured to execute at least one of the plurality of subtasks. The method may further comprise ranking devices from the one or more available devices based on an amount of usage over time of the one or more available devices, selecting a second device from among the one or more available devices based on the ranking of the one or more available devices, determining a first subtask from the plurality of subtasks for the second device to execute based on capabilities of the second device, and sending to the second device instructions to execute the determined first subtask.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

In the Figures.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for robot cloud computing. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. In some examples, a robot may be configured to receive a second device, such as mobile phone, that may be configured to function as an accessory or a "brain" of the robot.

In examples described herein, a robot may interact with the cloud to perform any number of actions, such as to share information with other cloud computing devices. Within examples, a robot may interact with the cloud to facilitate object recognition, to perform a mapping function, or to perform navigational functions (i.e., receive a map/navigation pathway previously traversed by another robot). In other examples, a robot may interact with the cloud to perform mapping of objects in an area, to perform inventory of objects, and to perform voice recognition/control by a robot. A robot may perform any actions or queries to the cloud as described herein based on contextual or situational information.

1. Cloud Computing Architecture

Figure 1:
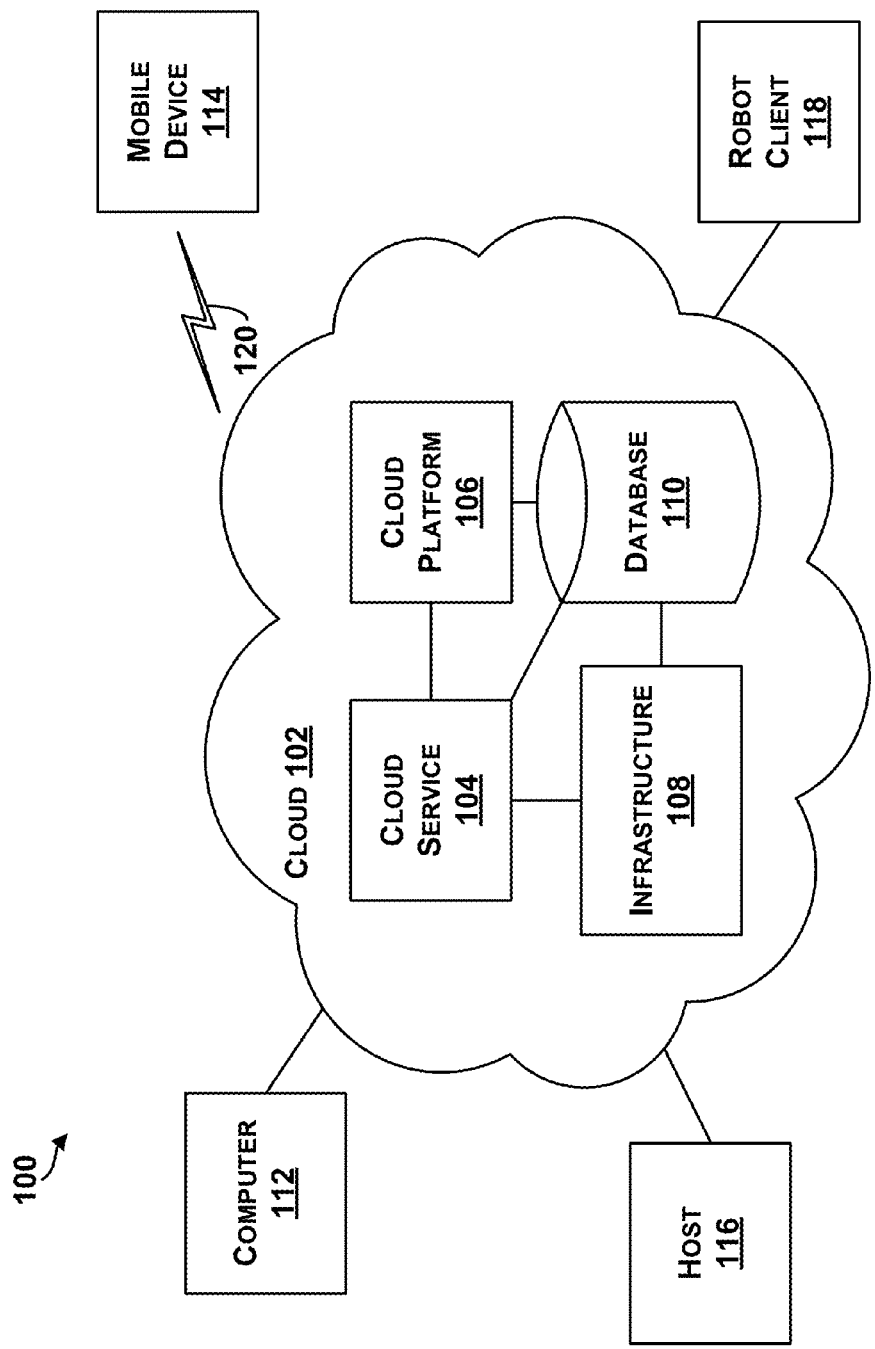
FIG. 1 is an example system for cloud-based computing.

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three—tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. Example Robot Architecture

Figure 2A:
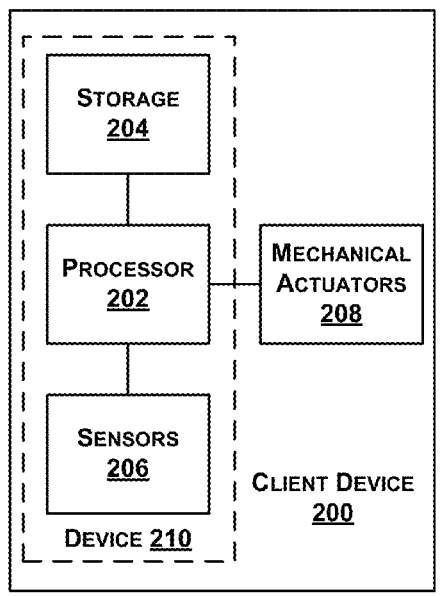
FIG. 2A illustrates an example client device.

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, and sensors 206) may all be custom designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscope, accelerometer, a camera, radar, capacitive sensors and touch sensors, etc.

The client device 200 may also have components or devices that allow the client device 200 to interact with its environment. For example, the client device 200 may have mechanical actuators 208, such as motors, wheels, movable arms, etc., that enable the client device 200 to move or interact with the environment.

In some example, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some example, the client device 200 may be configured to receive a device, such as device 210, that includes the processor 202, the storage 204, and the sensors 206. For example, the client device 200 may be a robot that have a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch screen, etc., that are included within the device 210.

Figure 2B:
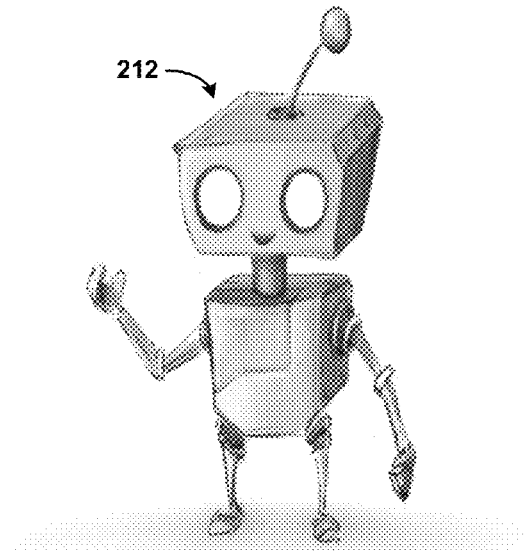
FIG. 2B illustrates a graphical example of a robot.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
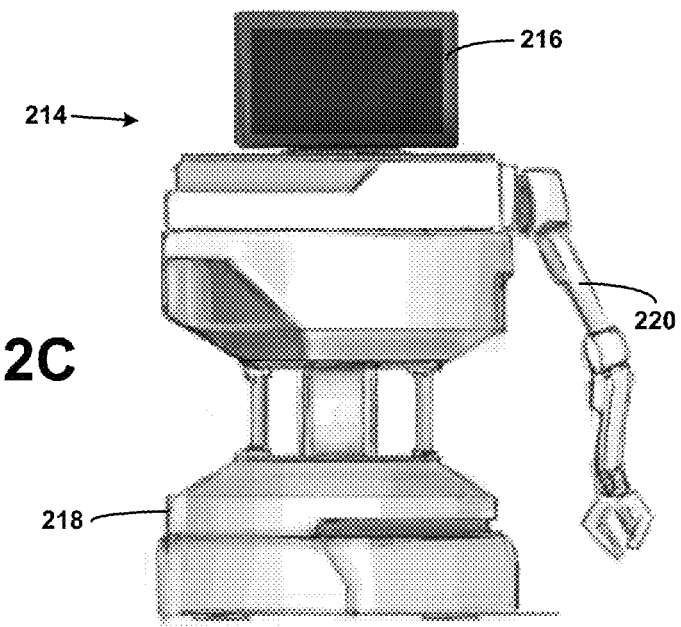
FIG. 2C illustrates another example of a robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software. A robot operating system may include publish and subscribe functionality, and may also include functionality to control components of the robot, such as head tracking, base movement (e.g., velocity control, navigation framework), etc.

3. Robot and Cloud Interaction

Figure 3:
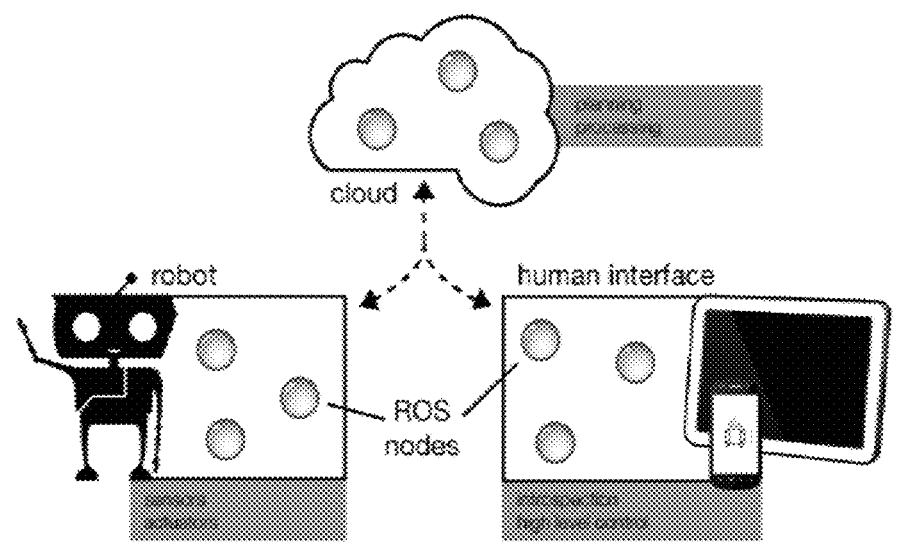
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the internet.

Figure 4:
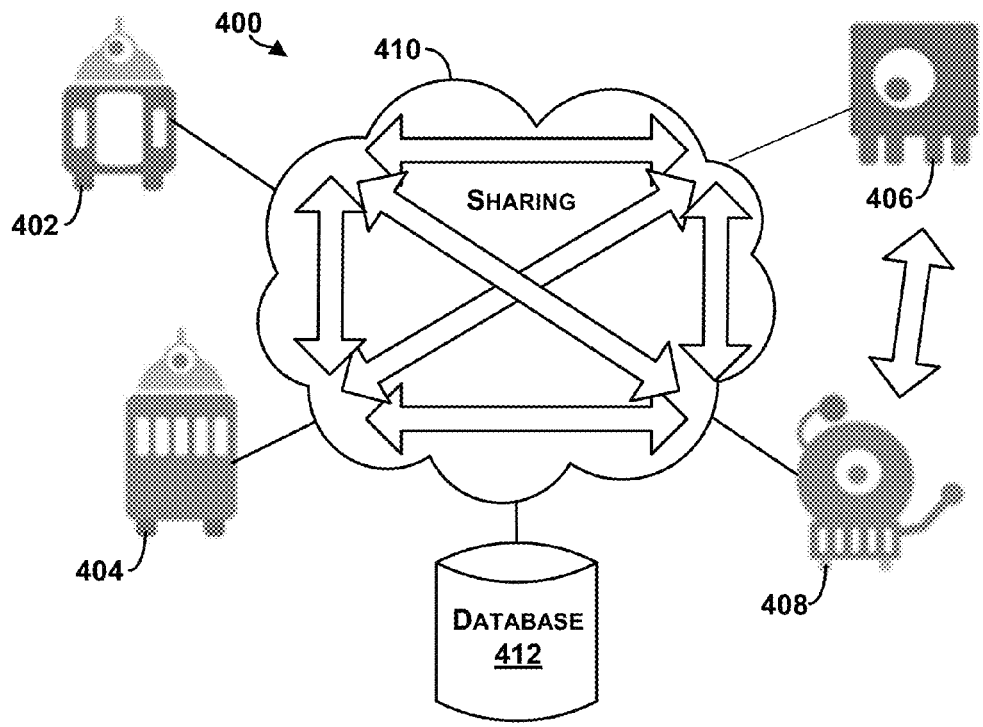
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data to all the robots connected to the cloud 410 about the recognized object, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions with an area, people, other robots, etc. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., such as for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and builds a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map).

Thus, within examples, the robots 402, 404, 406, and 408 may share information through the cloud 410, and may access the database 412.

4. Example Robot Tasks and Distribution of Subtasks

As mentioned above, a cloud computing network may provide assistance to a robot to complete a task. In one example, the task of the robot may include a plurality of subtasks. Example subtasks may include data computation, or physical interactions with an environment of the robot. In one case, the cloud computing network may determine that the task cannot be executed without assistance from other robots. In another case, the cloud computing network may determine that the task can be executed more efficiently if the robot receives assistance from other robots. In either of these cases, the cloud computing network may facilitate the assistance from other robots in executing the task.

Figure 5:
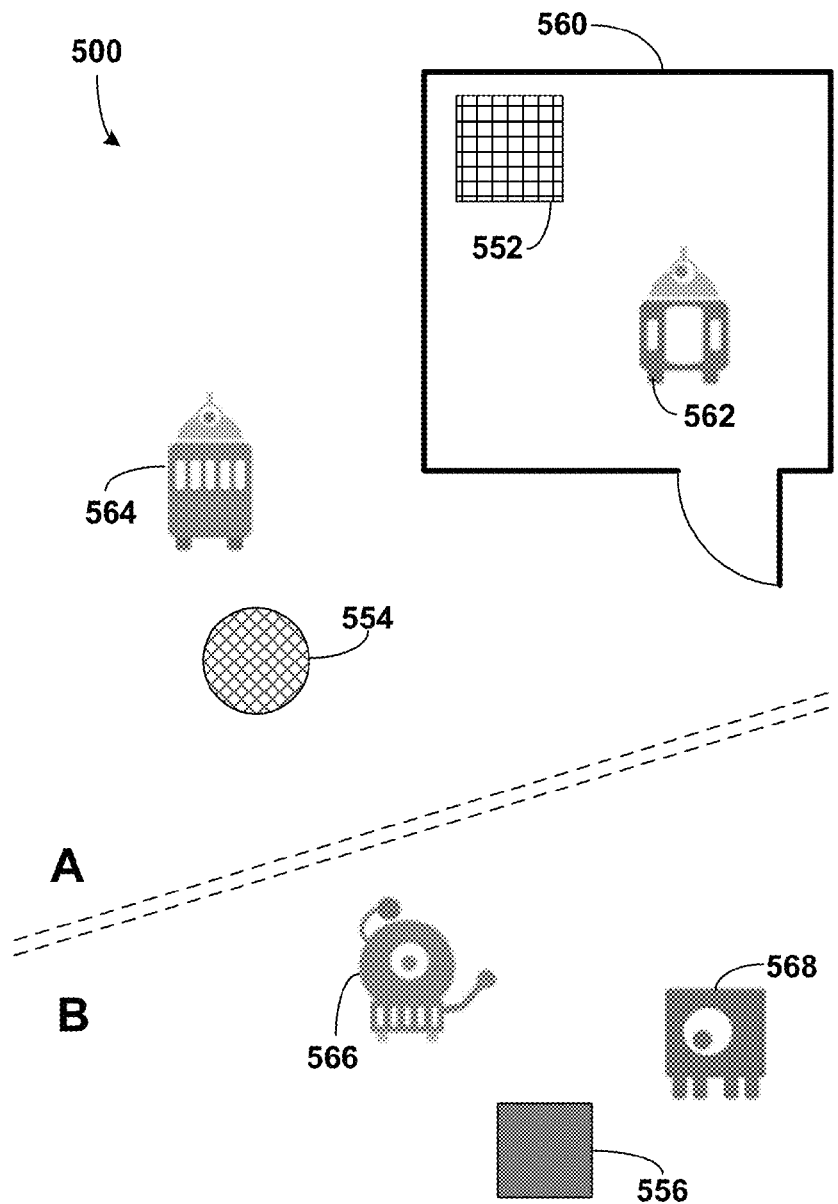
FIG. 5 illustrates an example system of robots executing tasks or subtasks of tasks.

FIG. 5 illustrates an example system 500 of robots executing tasks or subtasks of tasks. In one example, the system 500 includes robots 562, 564, 566, and 568; tasks 552, 554, and 556; and a room 560 with a lockable door. As shown, the room 560, robots 562 and 564 are physically located at a location A, and tasks 552 and 554 are tasks that may be executed at location A. In one case, robot 562 and task 552 may be located in room 560. In addition, robots 566 and 568 may be physically located at a location B, and task 556 is a task that may be executed at location B. The locations A and B may be two areas a distance apart, in relative close proximity, or any distance in between. In one example, locations A and B may be two cities in different parts of the world. In another example, locations A and B may be opposite ends of a concert hall. In yet another example, locations A and B may be different floors of an office building.

In an example, the robots 562, 564, 566, and 568 may be robots equipped with mechanic actuators and may be capable of executing tasks and subtasks involving interactions with an environment. In one case, interactions with the environment may include physical manipulations of the environment. For example, one of the robots 562, 564, 566, or 568 may be configured to arrange chairs in a concert hall, or clear items off a table. In another case, interactions with the environment may include movement through the environment without physical manipulations of the environment. For example, a robot may be configured to take photographic images of an object from multiple angles, or generate a geographic map of an area by collecting information while traversing the area.

In another example, tasks 552, 554, and 556 may be specific to the locations A or B. In one example, task 552 may involve removing items from a table in room 560 at location A. As such, executing task 552 may require the robot 562 to be in room 560. In another example, task 556 may involve generating a three-dimensional image of an object at location B. In this example, generating the three-dimensional of the object may involve at least one of the robots 566 and 568 to capture photographic images of the object from multiple angles. As such, executing task 556 may require at least one of the robots 566 or 568 to be at location B. In this case, the subtask 556 may be executed in less time if both robots 566 and 568 captured photographic images of the object than if only one of the robots 566 and 568 captured photographic images of the object.

In a further example, tasks 552, 554, and 556 may be subtasks of a larger task. In one case, the larger task may be to clean up a house. In this case, tasks 552, 554, and 556 may be subtasks of the larger task to clean up a house, involving cleaning up locations A and B. In yet another example, tasks 552, 554, and 556 may each include subtasks. In the example above, where task 552 may involve removing items from a table in room 560, subtasks of task 552 may include entering room 560, locating the table, picking up items from the table, and placing the items at a different location.

Figure 6:
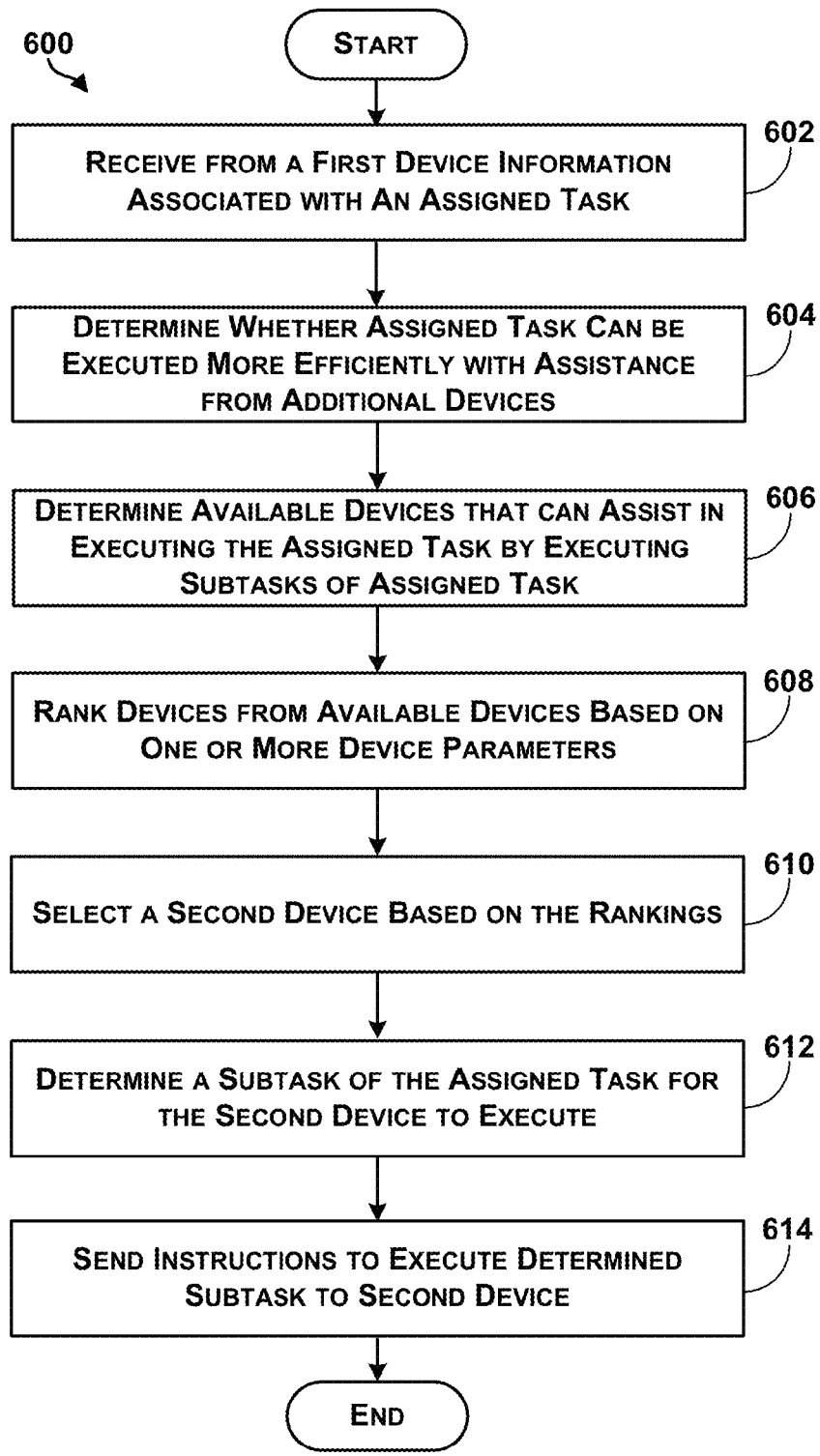
FIG. 6 is a block diagram of an example method for facilitating the execution of an assigned task with assistance from available robots.

FIG. 6 is a block diagram of an example method 600 for facilitating the execution of an assigned task with assistance from available robots, in accordance with at least some embodiments described herein. Method 600 shown in FIG. 6 presents an embodiment of a method that could be used with the systems 100, 400, and 550 for example, and may be performed by a device, such as other devices illustrated in FIGS. 1-5, or components of the device. Method 600 may include one or more operations, functions, or actions as illustrated by one or more of blocks 602-614. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 6A may represent circuitry that is wired to perform the specific logical functions in the process.

At block 602, the method 600 includes receive from a first device information associated with an assigned task. In one example, the information may be received at a server, and the first device may be a robot in communication with the server. In one case, the assigned task may include a plurality of subtasks, and one of the plurality of subtasks may involve an interaction with the environment. In one instance, the interaction with the environment may involve manipulating physical objects in the environment, thereby physically changing the environment. In another instance, the interaction with the environment may involve traversing a geographical landscape, and not physically changing the environment, as discussed above. In another example, information associated with the assigned task may include device capability requirements for executing the assigned task and subtasks of the assigned task.

At block 604, the method 600 includes determine whether the assigned task can be executed more efficiently with assistance from additional devices. In one example, determining whether the assigned task can be executed more efficiently may include determining whether the assigned task can be executed in less time if the first device receives assistance from additional devices compared to if the first device does not receive assistance. In one case, subtasks of the assigned task may be evaluated to determine which, if any of the subtasks may be executed in parallel. In this case, if two subtasks can be executed in parallel by the first device and another device, then the two subtasks may be executed in parallel in less time than if the same two subtasks are executed by the first device in series.

At block 606, the method 600 includes determine available devices that can assist in executing the assigned task by executing subtasks of the assigned task. In one example, the available devices may include devices that are idle and configured to execute at least one of the subtasks of the assigned task. In one case, determining available devices that can assist in executing the assigned task may include determining statuses of mechanical actuators and processing components of devices in a pool of devices in communication with the server, and selecting as an available device any device in the pool of the devices that has a mechanical actuator or a processing component that is currently in an idle status. In another case, any device in the pool of devices that has a mechanical actuator or a processing component that will become idle and accordingly become available during a time frame when the assigned task is to be executed may also be selected as an available device. In addition to the status of mechanical actuators and processing components of devices in the pool of devices, mechanical and processing capabilities of the devices in the pool of devices may also be based on to determine available devices.

In one instance, any device having mechanical capabilities to execute at least one of the subtasks of the assigned task may be determined as an available device. For example, if one of the of subtasks involves lifting an object of a size and weight, then any device having mechanical capabilities to lift an object of the size and weight may be determined as an available device. In another instance, any device having processing capabilities to execute at least one of the subtasks of the assigned task may be determined as an available device. For example, if one of the subtasks involves a specific algorithm for audio signal noise reduction, then any device having processing components capable of executing the specific algorithm may be determined as an available device.

In another case, determining available devices that can assist in executing the assigned task may include determining levels of reserve power of devices in the pool of devices, and selecting as an available device any device that has a reserve power level above a predetermined threshold amount. In one instance, any device having a full reserve power level may be selected as an available device. In another instance, the predetermined threshold amount may be based on power requirements of subtasks of the assigned task. For example, if one of the subtasks of the assigned task involves retrieving a document from a printer, then any device from the pool of devices having sufficient reserve power to execute the task of retrieving a document from the printer may be selected as an available device. In another example, one of the subtasks of the assigned task may involve heavy computing of complex data and does not involve device movement or any physical interaction with the environment. In this example, any device from the pool of devices that may be currently coupled to a charging station and being charged may be selected as an available device, regardless of the actual reserve power level of the device.

In a further case, determining available devices that can assist in executing the assigned task may include determining a geographical location of devices in the pool of devices, and selecting as an available device any device that is capable of relocating to a subtask location where at least one of the subtasks of the assigned task is to be executed. In one instance, the assigned task may be task 556, as shown in FIG. 5, and all the subtasks of the assigned task are to be executed at location B. In this case, if location A and location B are separated by a large distance such that robot 564 is unable to relocate to location B to execute any of the subtasks of the assigned task 556, then robot 564 may not be determined as an available device.

In some cases, a time requirement for when the subtasks of the assigned task are to be executed may also be considered. For instance, robot 564 may be able to relocate to location B, but may take 12 hours to do so, for example. In this instance, if at least one subtask of assigned task 556 does not need to be executed within 12 hours, then robot 564 may be determined as an available device. On the other hand, if all subtasks of assigned task 556 are to be executed within 12 hours, then robot 564 may not be determined as an available device because robot 564 is unable to relocate to location B in time to execute any of the subtasks of assigned task 556.

At block 608, the method 600 includes rank devices from available devices based on one or more device parameters. In one example, a device parameter based upon to rank the available devices may be an amount of usage over time of the available device. In this example, the amount of usage over time of the available device may include usage of mechanical actuator components of the device. For instance, a mileage of the device may indicate the distance travelled by a mobility component of the device. In another instance, a previous work load of the device may indicate an amount of weight carried by the device over a distance travelled by the device over time.

In one case, robots 564 and 566 of FIG. 5 may both be determined as available devices for assisting robot 562 with executing task 552. In this case, an amount of usage of robot 564 may indicate that robot 564 has travelled one thousand miles and lifted a total of ten thousand tons. On the other hand, an amount of usage of robot 566 may indicate that robot 566 has travelled three thousand miles and lifted a total of five hundred tons. In one instance, robots 564 and 566 may be ranked differently based on either a total miles travelled, weight lifted, or a combination of miles travelled and weight lifted. For example, robot 564 has travelled fewer miles than robot 566, but has lifted more tons than robot 566. As such, robot 564 may be ranked lower than robot 566 if ranking based on mileage, but may be ranked higher than robot 566 if based on weight lifted. In another example, the combination of miles travelled and weight lifted of each robot may be calculated as a weighted product of the two values, and may be used to rank the robots. In some cases, ranking of available devices may also be based on least amount of usage, such that robots having fewer miles or lifted fewer tons may be ranked higher.

In another example, a device parameter based upon to rank available devices may be a geographical proximity to the first device. In one case, the geographical proximity to the first device may be based on a point-to-point distance between an available device and the first device. In another case, the geographical proximity to the first device may be based on a distance an available device has to travel to reach the first device, accounting for environmental obstacles and suitable paths over which the available device may traverse. In a further case, the geographical proximity to the first device may be based on an expected time required for an available device to reach the first device. The expected time for an available device to reach the first device may vary based on environmental factors such as road surfaces or terrain variations, or based on device mechanical factors such as device movement power and device weight. As such, different available devices taking same paths to the first device may take different amounts of time, even if the travel distance may be the same.

In one case, robots 566 and 568 of FIG. 5 may both be available devices for assisting robot 564 with executing task

554. In this case, robots 566 and 568 may be the same distance from where robot 564 is located, and where task 554 is to be executed. However, robot 566 may be a slower moving robot than robot 568. Accordingly, robots 566 and 568 may be ranked differently based on geographical proximity based on different expected times for robots 566 and 568 to reach robot 564, despite the robots 566 and 568 being at the same distance from robot 564.

At block 610, the method includes select a second device based on the ranking of available devices. In one example, the received information associated with the assigned task may indicate how the ranking based upon to select the second device may be utilized. In the case that the device parameter based upon to rank the available devices is the amount of usage, an available device having the least amount of usage, or an amount of usage less than the average amount of usage of the available devices may be selected if the received information indicates that the assigned task involves a greater than average amount of mechanical movements. In another case when the device parameter based upon to rank the available devices is the amount of usage, an available device having the most amount of usage, or an amount of usage greater than the average amount of usage of available devices may be selected if the received information indicates that the assigned task involves a less than average amount of mechanical movements. As such, over-use of available devices may be avoided or prevented, thereby possibly extending the lifetime of available devices. In the case of robots 564 and 566 being available devices to assist task 562 with executing task 552, if task 552 requires an above average amount of lifting heavy objects, then robot 566 may be selected over robot 564 because robot 566 has lifted fewer number of tons than robot 564.

In another case, in which the available devices are ranked based on geographical proximity to the first device, an available device nearest to the first device, or relatively near the first device as compared to other available devices may be selected if the received information indicates that the assigned task involves interactions with the environment at a location of the first device, or at a location near the first device. On the other hand, an available device relatively far from the first device as compared to other available devices may be selected if the received information indicates that the assigned task involves only computational subtasks and does not involve interactions with the environment at the location of the first device or the location near the first device, for example. In an example, robots 566 and 568 at location B may be available devices to assist robot 564 with executing task 554 at location A. In this case, robot 568 may be selected over robot 566 because robot 566 is slower moving than robot 568, and accordingly, robot 568 may be able to relocate to location A, where task 554 is to be executed in less time.

At block 612, the method includes determine a subtask of the assigned task for the second device to execute. In one example, determining the subtask for the second device to execute may be based on capabilities of the selected second device. In this example, determining a subtask of the assigned task may further include receiving device information indicating capabilities of a second device. In some cases, the device information associated with the second device may be received by the server when determining available devices at block 606, or may be received by the server after the second device has been selected. In some other cases, a portion of the device information indicating capabilities of the second device relevant to whether the second device is an available device may be received when determining available devices at block 606, while a remaining portion of the device information may be received after the second device has been selected.

In an example, capabilities of the second device used to determine a subtask for the second device to execute may include processing and mechanical capabilities. As discussed above, a device from a pool of devices can be determined as an available device if the device has processing capabilities or mechanical capabilities to execute at least one of the subtasks of the assigned task. In this case, each subtask of the assigned tasks may have processing requirements or mechanical requirements. Accordingly, a subtask of the assigned task may be selected for the second device to execute if the subtask has processing requirements or mechanical requirements met by the processing capabilities or mechanical capabilities, respectively of the second device.

In an example, the selected second device may be robot 564 or FIG. 5, and the assigned task robot 564 has been selected to assist robot 562 with executing is task 552. In this case, robot 564 may have mechanical capabilities indicating one mechanical actuator arm that has an idle status. In one instance, task 552 may have plurality of subtasks, of which two subtasks may have mechanical requirements of one idle mechanical actuator arm, while three subtasks may have mechanical requirements of three idle mechanical actuator arms. In this instance, robot 564 may have been determined as an available device because robot 564 is capable of executing at least one of the subtasks of task 552 by virtue of having one idle mechanical actuator arm. As such, only one of the two subtasks having mechanical requirements of one idle mechanical actuator arm may be selected for the second device to execute because the mechanical capabilities of the second device meets only the mechanical requirements of those two subtasks.

As discussed previously, selection of the second device from the available devices may have been based on a ranking of the amount of usage of the second device with the potential benefit of preventing device over-use and extending the lifetime of the second device. As such, determining a subtask for the second device to execute may include selecting a subtask that has a degree of mechanical difficulty inversely proportional to the amount of mechanical component usage of the second device. Continuing with the above example, a subtask from the two subtasks having mechanical requirements satisfied by the mechanical capabilities of robot 564 may accordingly be selected for robot 564 to execute based on the amount of mechanical component usage of robot 564. For example, one of the two subtasks may involve a large amount of lifting of heavy objects, and therefore may have a high degree of mechanical difficulty, while the other of the two subtasks may involve traversing a short distance on a smooth path, and therefore may have a low degree of mechanical difficulty. In the case when robot 564 has an amount of mechanical component usage less than the amount of mechanical component usage of robot 566, or less than the average amount of mechanical component usage of available devices (including robots 562, 566, and 568, for example), the subtask with the high degree of mechanical difficulty may be determined as the subtask for robot 564 to execute. In another case, if robot 564 has an amount of mechanical component usage greater than the average amount of mechanical component usage of available devices, the subtask with the low degree of mechanical difficulty may be determined as the subtask for robot 564 to execute.

As discussed above, available devices from the pool of devices may be determined based on geographic locations of the devices, and the second device may be selected based on a ranking of available device geographic proximities to the first device. As such, determining a subtask of the assigned task for the second device to execute may also be based on the geographic location of the second device. In one case, subtasks of the assigned task may include subtasks that are to be executed at a location where the first device is, or at a location near the first device. In the case when the second device was selected based on the ranking of available devices indicating the second device is geographically nearest to the first device, a subtask of the assigned task that is to be executed at the location of the first device, or at the location near the first device may be selected for the second device to execute. In the case discussed above, robot 568 of FIG. 5 may be geographically nearer to robot 564 than robot 566 by virtue of robot 568 being able to move faster than robot 566, and robot 568 may be selected be selected as the second device. In this case, a subtask of assigned task 554 that is to be executed at the location of robot 564 or the location near robot 564 may be determined for robot 568 to execute.

In another case, the subtasks of the assigned task may also include subtasks that are to be executed at subtask locations different from the location of the first device, but rather a distance from the first device. In this case, a subtask of the assigned task can be selected according to a geographical proximity between subtask locations where the subtasks are to be executed and the location of the second device.

In a further example, a subtask of the assigned task for the second device to execute may be based on previous experiences of the second device. The previous experiences of the second device may indicate subtasks the second device has previously executed, and may be received at the server as part of device information received for determining available devices or the portion of device information received after the second device has been selected. In one case, one of the subtasks the second device has previously executed may be complex, and may have required a trial and error process for the second device to execute. In this case, if a subtask from the assigned task is the same as the complex subtask the second device has executed previously, the subtask may be determined for the second device to execute. In one instance, two subtasks may be the same if the two subtasks may be executed following the same procedure. As such, the second device may be able to execute the complex subtask more efficiently, without the trial and error process if the second device retained information on how to execute the complex subtask while going through the trial and error process to execute the subtask previously.

At blocks 608-612, discussions of ranking devices, selecting a second device, and determining a subtask for the second device have been directed to devices determined as available devices at block 606, excluding the first device. However, in some examples, the first device may also be ranked with the determined available devices at block 608, selected based on rankings at block 610, and assigned a subtask based on capabilities of the first device at block 612, for example.

At block 614, the method includes send instructions to execute determined subtask to second device. In one example, the instructions may be sent to the second device as soon as the subtask for the second device to execute is determined. In another example, the instructions may be sent to the second device any time before when the determined subtask is to be executed. After receiving the instructions, the second device may evaluate the assigned subtask and determine whether the subtask assigned to the second device can be executed.

In one case, the second device may determine that the subtask can be executed by the second device, and accordingly send information to the server, indicating that the assigned subtask has been accepted and will be executed. In another case, a component status or capability of the second device may have changed between when the subtask was determined for the second device to execute and when the determined subtask is to be executed. In this case, the second device may no longer be able to execute the assigned subtask due to the change in component status or capability. As such, the second device may determine that subtask cannot be executed by the second device, and accordingly send information to the server indicating that the second device is unable to execute the assigned subtask.

In yet another example, the second device may determine during an execution of the assigned subtask that the subtask cannot be executed by the second device or further, cannot be executed at all. For example, the assigned subtask may involve carrying an object over a river on a bridge. If during the execution of the assigned subtask, the second device discovers that the bridge has collapsed, the second device may determine that the subtask of carrying an object over the river on the bridge cannot be executed at all, and may accordingly send information to the server indicating so.

To further illustrate how a server may facilitate assistance from other devices to execute a task according to method 600, example scenarios A and B are provided. Scenario A may involve an assigned task of opening a locked door, and scenario B may involve an assigned task of arranging furniture in a concert hall. For added context, the example system 500 of robots in FIG. 5 as discussed above may be applied to these scenarios.

In scenario A, robot 564 may have been assigned a task involving executing task 552, which may require entering room 560. However, the door to room 560 may be locked and the robot 564 may not have a key to unlock the door. As such, the assigned task involving executing task 552 may include a subtask of unlocking the door. In this case, subtasks of the assigned task may include unlocking the door from outside room 560 using the key, or unlocking the door from inside room 560 without using key. In one case, because robot 564 is outside room 560, robot 564 may locate the key for unlocking the door, and acquire the key before unlocking the door and executing 552. This may require robot 564 to travel to a different location to pick up the key and return to the door of room 560 to unlock the door. In this case, the server may determine that the task 552 may be executed in less time if a different robot assists robot 564 with executing one of the subtasks to unlock the door. The server may determine available robots from a pool of devices including robots 562, 566, and 568 that can assist robot 564 in executing one of the subtasks of unlocking the door to room 560.

In one example, device information may be received for each of the robots 562, 566, and 568 indicating statuses and capabilities of the respective robots. In one example, device information associated robot 568 may include status information indicating robot 568 is idle, geographic information indicating that robot 568 is at location B, and mechanical availability information indicating that robot 568 has a key to the locked door and is capable of moving from location B to location A. Similarly, device information associated with robot 562 may include status information indicating robot 562 is idle, geographic information indicating that robot 562 is at location A, and inside room 560, and mechanical capability information indicating an ability to open the locked door from inside room 560, without using the key. On the other hand, device information received from robot 566 may include status information indicating that robot 566 is not idle. Accordingly, robots 568 and 562 may be determined as available robots, while robot 566 may be determined as unavailable.

Robot 568 and 562 may then be ranked according to device parameters such as geographic proximity. In this case, robot 562 is at location A, inside room 560, while robot 568 is at location B. As such, robot 562 is geographically closer to robot 564 than robot 568, and accordingly, robot 562 may be ranked higher than robot 568, based on geographical proximity. Based on this ranking, robot 562 may then be selected as the second device for assisting robot 564 with unlocking the locked door to room 560.

As discussed above, robot 562 has a mechanical capability of opening the locked door from inside the room, without the use of the key. As such, the subtask of unlocking the door from inside room 560 without the use of the key, rather than the subtask of unlocking the door from outside room 560 using the key may be determined as the subtask for robot 562 to execute. Once the subtask for robot 562 has been determined, instructions may be sent to robot 562 to execute the subtask of unlocking the door from inside room 560.

Upon receiving the instructions to execute the subtask, a message may be received from robot 562 indicating that the instructions have been received and accepted. In one example, if robot 562 determines before or during execution of the subtask that the door to room 560 is blocked from the inside and inaccessible from where robot 562 is located inside room 560, a message may be received from robot 562 indicating that the subtask of unlocking the door from inside room 560 cannot be executed by robot 562. In this case, another robot, such as robot 568 may be selected and assigned the task of unlocking the door from outside room 560.

In scenario B, robot 562 may be assigned a task 552 of arranging furniture at in room 560, which in this case may be a concert hall. In one example, the task 552 of arranging furniture in room 560 may include moving a large number of chairs and a grand piano. In one case, the server may determine that assistance is required for robot 562 to execute a subtask of task 552 involving moving the grand piano, because robot 562 is unable to move the grand piano without assistance. In this case, the server may determine that the grand piano may require at least one other robot to move due to a size and weight of the grand piano. Further, the server may determine that a second subtask of task 552 involving moving the large number of chairs may be executed in less time with assistance from other robots. In this case, the server may determine that the large number of chairs may be arranged in less time with the assistance from at least one other robot. In one instance, task 552 may include a time requirement by which the furniture are to be moved and arranged. In this case, the server may determine that assistance from at least one other robot is required to arrange the furniture by the time requirement.

After determining that task 552 may be executed more efficiently with assistance from other robots, device information associated with robots 564, 566, and 568 indicating capabilities of the respective robots may be received and utilized to determine which of the robots 564, 566, and 568 are available to assist robot 562 with executing task 552. In one example, device information associated with robots 564, 566, and 568 may include status information indicating that each of the robots are idle, and mechanical availability information indicating that robots 564, 566, and 568 each have the capability of moving furniture. As such, each of the robots 562, 566, and 568 may be determined as available devices that can assist robot 562 with executing task 552.

Each of the available robots 564, 566, and 568 may then be ranked based on an amount of usage and geographical proximity. In one case, an amount of usage of robot 564 may indicate that robot 564 has travelled one thousand miles and lifted a total of ten tons, an amount of usage of robot 566 may indicate that robot 566 has travelled three thousand miles and lifted a total of five hundred tons, and an amount of usage of robot 568 may indicate that robot 568 has travelled five thousand miles and lifted a total of six hundred tons. As such, a ranking of robots 564, 566, and 568 based on amount of usage may rank robot 568 as having the least amount of usage. Further, geographical information of robot 564 may indicate that robot 564 is at location A, and geographical information of robot 566 and robot 568 may indicate that both robots 566 and 568 are at location B. As such, a ranking of robots 564, 566, and 568 based on geographical proximity may rank robot 564 as having a geographical proximity closest to robot 562 in room 560 where task 552 is to be executed.

Based on the amount of usage and geographical proximity rankings, robot 564 may be selected for having the least amount of usage as well as being the nearest to robot 562. Since robot 564 has the least amount of usage among the available devices, a subtask of task 552 having the highest degree of mechanical difficulty may be determined as the subtask for robot 564 to execute. In this case, the subtask of task 552 involving assisting robot 562 with moving the grand piano may have the highest degree of mechanical difficulty among the subtask of task 552, and may accordingly be assigned to robot 564.

In addition to requiring assistance from at least one other robot to move the grand piano, task 552 may further be executed in less time if robot 562 also receives assistance with moving the large number of chairs, as discussed above. In one example, robot 564 may also be assigned the subtask of task 552 involving moving the large number of chairs, in addition to assisting robot 562 with the subtask of moving the grand piano. In another example, robots 566 and 568 may each be selected and assigned the subtask of task 552 involving moving the large number of chairs, based on their capabilities to move furniture.

In a further example, robot 568 may be moving from location B to a location C through room 560 to execute a task at location C. In this case, a mechanical component of robot 568 involved with moving robot 568 from location B to location C may have a busy status. However, robot 568 may have another mechanical component that is a mechanical actuator arm capable of and configured to arrange furniture. In this case, if the mechanical actuator arm has an idle status, robot 568 may still be determined as an available device, for example. Further, a geographical proximity of robot 568 while robot 568 is moving through room 560 may indicate that robot 568 is near robot 562, where task 552 is to be executed. As such, robot 568 may be selected based on geographical proximity while robot 568 is in room 560, on the way from location B to location C. The subtask of assisting robot 562 with moving the large number of chairs may then be determined for robot 568 to execute, while moving through room 560. For example, robot 568 may provide assistance to robot 562 by moving a single chair across room 560 on the way to location C, while robot 568 is moving through room 560, on the way to location C. In this case, robot 568 may no longer be determined as an available robot after robot 568 has moved through room 560.

As discussed previously, the first device may also be ranked and selected among the available devices, and assigned a subtask to execute based on capabilities of the first device. As such, robot 562 may be ranked among the available robot 564, 566, and 568 based on an amount of usage of mechanical components. In this case, if robot 562 has a higher amount of mechanical component usage than the other available robots, robots 564 and 566 may be assigned the subtask of moving the grand piano, rather than robot 564 being assigned the subtask of assisting robot 562 with moving the grand piano. In this case, over-use of robot 562 may be prevented, thereby possibly extending the lifetime of robot 562.

After subtasks have been determined for robots 564, 566, and 568 to execute, instructions may be sent to robots 564, 566, and 568 instructing robots 564, 566, and 568 to execute the respective subtasks. Upon receiving the instructions to execute the subtask, messages may be received from robots 564, 566, and 568 indicating that the instructions have been received and accepted. In one example, if robot 564 determines before or during execution of the subtask of assisting robot 562 with moving the grand piano that mechanical actuator arms of robot 564 cannot be used to move the grand piano, a message may be received from robot 564 indicating that robot 564 is unable to execute the subtask. In this case, another robot, such as robot 566 may be selected and assigned the subtask of assisting robot 562 with moving the grand piano. In another example, robot 564 may determine during execution of the subtask of assisting robot 562 with moving the grand piano that the grand piano is bolted to the ground and therefore cannot be moved. In this case, a message may be received from robot 564 indicating that the subtask of moving the grand piano cannot be executed.

Figure 7:
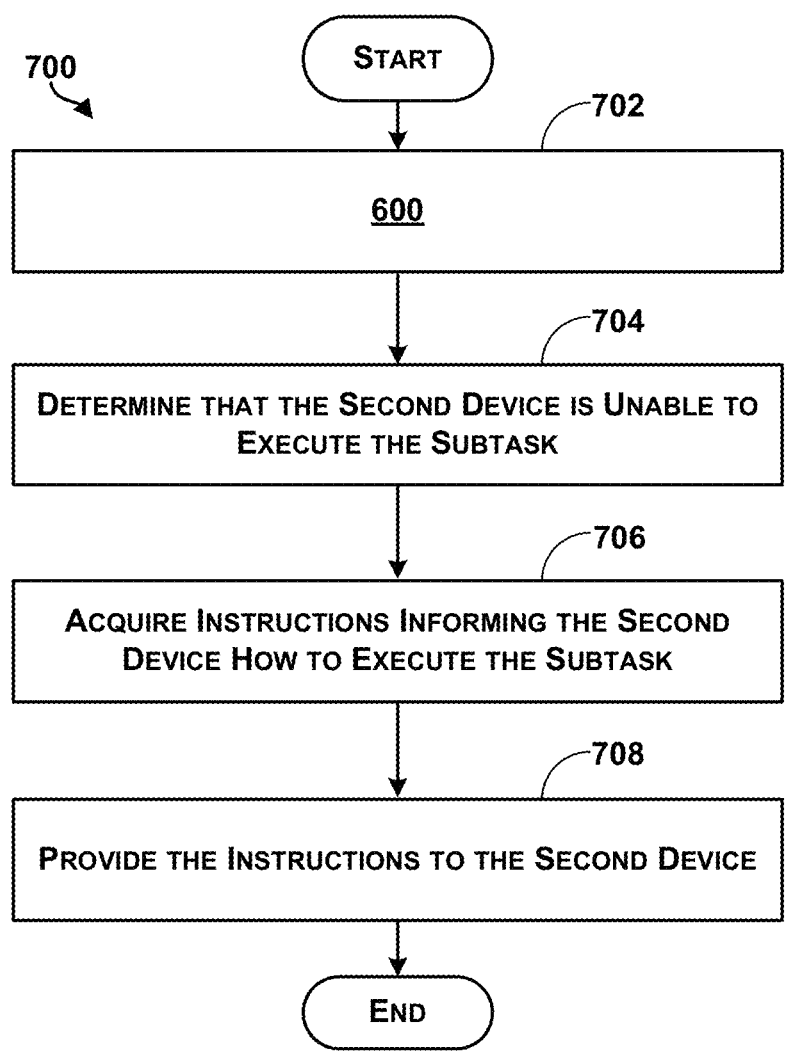
FIG. 7 is a block diagram of an example method for facilitating assistance to execute subtasks of an assigned task.

FIG. 7 is a block diagram of an example method for facilitating assistance to execute subtasks of an assigned task, in accordance with at least some embodiments described herein. Method 700 presents an embodiment of a method that, for example, could be used with the systems 100, 400, and 500 for example, and may be performed by a device, such as another devices illustrated in FIGS. 1-5, or components of the device. The various blocks of method 700 may be combined into fewer blocks, divided into additional blocks, and/or removed based upon the desired implementation.

At block 702, the method 700 includes blocks 602-614 of method 600. As such, a server has received information associated with an assigned task from a first device, determined that the task can be executed more efficiently with assistance from additional device, selected a second device from available devices based on a ranking based on a device parameter of the available devices, determined a subtask of the assigned task for the second device to execute, and sent instructions for the second device to execute the determined subtask. In other examples, the method 700 may be performed without first performing the method 600.

At block 704, the method 700 includes determine that the second device is unable to execute the subtask. As discussed above, the second device may be configured to determine whether the assigned subtask can be executed by the second device, or executed at all. In one example, the second device may determine whether the subtask can be executed based on a progress of executing the subtask. For instance, the subtask of the second device may include replacing a broken light bulb. In this case, if the second device is unable to remove the broken light bulb after a number of attempts, the second device may determine that the second device is unable to execute the subtask. In this case, the second device may send a message to the server indicating that the second device is unable to execute the subtask.

In another example, the server may determine that the second device is unable to execute a subtask according to subtask parameters which may be included in the information associated with the assigned task. For instance, the subtask parameters may include a subtask execution time, which may define a predetermined time within which the second device is expected to execute the subtask. In this case, when the subtask has not been executed after the predetermined time, the server may determine that the second device is unable to execute the task. In another case, the server may query the second device for a subtask execution update indicating progress of executing the subtask, and determine whether the second device is able to execute the subtask based on a response from the second device.

At block 706, the method 700 includes acquire instructions informing the second device how to execute the subtask. In one example, after the server has determined that the second device is unable to execute the subtask, the server may first determine a reason why the second device is unable to execute the subtask, and then acquire instructions addressing the determined reason. In the instance the second device is unable to execute the subtask of replacing a broken light bulb because the second device is unable to remove the broken light bulb after a number of attempts or within a predetermined time, the server may send a request to other servers for instructions informing how the broken light bulb can be removed.

In one example, the server may search within other servers in a cloud computing network for instructions informing a device how to remove a broken light bulb. In another example, the server may query a pool of devices for instructions informing how the other devices may have removed broken light bulbs. In this case, the pool of devices may be devices that have previously removed broken light bulbs. In another example, the server may query a human operator for instructions informing a device how to remove a broken light bulb. In this case, querying a human operator for instructions may include providing a control interface to the human operator such that the human operator may control the second device to remove the broken light bulb.

At block 708, the method 700 includes provide the instructions to the second device. In an example, after instructions informing the second device how to execute the subtask is acquired, either from other servers, other devices, or a human operator, the instructions may be provided to the second device. In the cases when the instructions are received from another server or from another device, the information may be sent to the second device once the instructions have been received.

In the case when receiving the instructions informing the second device how to execute the subtask includes a human operator controlling the second device to execute the subtask via a control interface, the instructions may be provided to the second device as each human operator controlled action of the second device is received from the control interface. In some cases, the series of human controlled device actions may further be stored by the server as instructions for how to execute the subtask. In these cases, the stored instructions may be provided to a third device when the third device is unable to execute the subtask and accordingly prompts a search for instructions informing the third device how to execute the subtask.

In a further example, the received instructions may be associated with the executed subtask, and sent to other devices when instructions to execute the subtask are sent to the other devices. For instance, a third device may be selected from among the available devices, and another subtask may have been assigned to the third device based on capabilities of the third device. In one case, the other subtask may be the same as the executed subtask, such that the other subtask and the executed subtask may be executed following the same actions and procedures. In this case, the server may send the received instructions to the third device when sending instructions to the third device to execute the other subtask, informing the third device how to execute the other subtask.

Referencing scenario A, in which the case robot 562 was assigned the subtask of unlocking the door from inside room 560, robot 562 may encounter difficulties executing the subtask. For instance, robot 562 may be unable to properly manipulate the locking mechanism of the door to unlock the door. In one case, robot 562 may determine that the robot 562 is unable to unlock the door after three attempts, for example, and may accordingly send the server a message indicating so. In another case, the server may determine that the robot 562 is unable execute the subtask if the robot 562 has not unlocked the locked door after a predetermined time of fifteen minutes, for example.

In the case robot 562 is unable to execute the task of unlocking the door because robot 562 is unable to manipulate the locking mechanism of the door, the server may determine that a processing capability of robot 562 is unable to determine proper movements for a mechanical actuator arm of robot 562 to manipulate the locking mechanism of the door to unlock the door. In this instance, the server may search within other servers in the cloud computing network for instructions informing a device how to manipulate the locking mechanism of the door. In another instance, the server may query a human operator by providing the human operator a control interface for controlling robot 562. In this instance, the human operator may control the mechanical actuator arm of robot 562 to successfully manipulate the locking mechanism of the door, and unlocking the door.

Once instructions informing a device how to manipulate the unlocking mechanism of the door has been acquired, the instructions may then be provided to the robot 562. In the case the instructions are acquired from other servers in the cloud computing network or other robots, robot 562 may execute the subtask of unlocking the door according to the provided instructions once the robot 562 receives the instructions. In the case when the human operator is provided a control interface to control the robot 562, the instructions informing robot 562 how to execute the subtask may be provided to the robot 562 each time the human operator enters an input via the control interface. In this case, each input entered by the human operator may further be recorded and stored by robot 562 as a set of movement instructions. The set of movement instructions may then be followed when robot 562 is assigned a subtask of unlocking a door in the future. The set of movement instructions may also be stored in the server and distributed to other robots when other robots are assigned a subtask of unlocking a door or when other robots are determined to be unable to execute subtasks of unlocking a door, as discussed above.

Referencing scenario B, robot 564 may have been assigned the subtask of assisting robot 562 with moving the grand piano, while robots 566 and 568 may have been assigned the subtask of arranging chairs. In an example, robot 564 may have difficulties moving mechanical actuator arms of robot 564 to achieve a suitable grip on the grand piano for moving the grand piano. In one case, robot 564 may determine that robot 564 is unable to execute the subtask of moving the grand piano because robot 564 has been unable to achieve the suitable grip after a number of attempts, and may accordingly send a message to the server indicating so. In another case, the server may determine that the combination of robot 564 and robot 562 is unable to execute the subtask of moving the grand piano if the grand piano has not been moved after a predetermined time.

In another example, the chairs to be arranged in room 560 may be folding chairs and the subtask of arranging a chair may include folding a chair, moving the chair to a designated location and unfolding the chair before placing the chair in a designated position. In this example, robot 568 may have difficulties executing the subtask of arranging chairs because robot 568 may have difficulties moving mechanical actuator arms of robot 568 to unfold the chairs. In one case, robot 568 may determine that robot 568 has difficulties unfolding chairs during execution of the subtask of arranging chairs and may accordingly send a message to the server indicating so. In another case, the server may determine robot 568 is unable to execute the subtask of arranging chairs because robot 568 has not arranged a single chair after five minutes, for example.

In the case robot 564 is unable achieve the suitable grip on the grand piano to execute the subtask of moving the grand piano with robot 562, the server may determine that a computational capability of robot 564 is unable to determine proper movements for a mechanical actuator arm of robot 564 to achieve the suitable grip on the grand piano, and may proceed to acquire instructions informing robot 564 how to achieve the suitable grip. In one case, the server may query robot 562 for the instructions, if robot 562 has already achieved a suitable grip on the grand piano. Once instructions informing robot 564 how to achieve the suitable grip on the grand piano has been acquired, the instructions may be provided to robot 564 for robot 564 to follow and execute the task. The set of movement instructions may also be stored and distributed to other robots when other robots are assigned subtasks of moving a grand piano.

In the case when robot 568 has difficulties with unfolding the chairs, similar steps may be taken to inform robot 568 how to unfold the chairs. In one example, instructions informing robot 568 how to unfold chairs may be acquired from robot 566, if robot 566 has been successfully executing the subtask of arranging chairs, including unfolding of the chairs. In another example, instructions for how to unfold chairs may be acquired from searching within other servers in the cloud computing network. In yet another example, instructions may be acquired by providing a human operator with a control interface to control robot 568, as discussed above.

Figure 8:
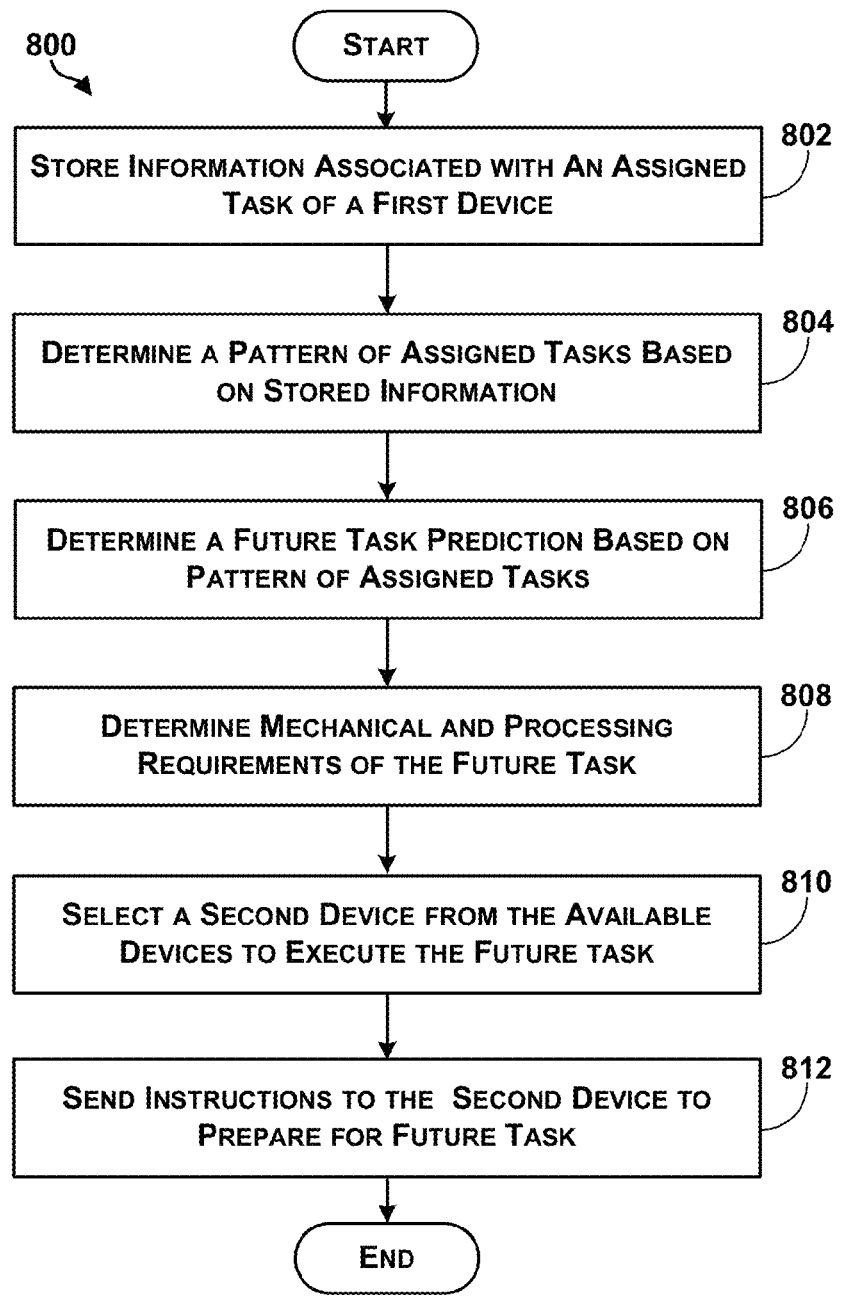
FIG. 8 is a block diagram of an example method for facilitating preparation for the execution of a predicted future task in advance of a future time.

FIG. 8 is a block diagram of an example method for facilitating the execution of a predicted future task in advance of a future time, in accordance with at least some embodiments described herein. Method 800 presents an embodiment of a method that, for example, could be used with the systems 100, 400, and 500 for example, and may be performed by a device, such as another devices illustrated in FIGS. 1-5, or components of the device. The various blocks of method 800 may be combined into fewer blocks, divided into additional blocks, and/or removed based upon the desired implementation.

At block 802, the method 800 includes store information associated with an assigned task of a first device. In one example, the assigned task and the first device may be the assigned task and first device discussed above in reference to method 600 and 700. The information associated with the assigned task of the first device may indicate a plurality of subtasks included in the assigned task as well as device capabilities required to execute the subtasks of the assigned task. The information may further indicate whether the first device executed the assigned task with or without assistance. If the first device executed the assigned task with assistance, the information my further indicate which subtasks were executed by the first device, and which subtasks were executed by other devices. The information may also indicate which assigned tasks were executed more efficiently with assistance from other devices, and which assigned tasks were not.

At block 804, the method 800 includes determine a pattern of assigned tasks based on the stored information. In one example, each time a device receives a task assignment, information associated with the assigned task may be stored, and a database of assigned tasks can be generated. In one example, the assigned task may have been assigned to different devices a number of times in the past. In this case, parameters associated with the past assignments may be compiled to determine a pattern of task assignments. In one example, the task may have been assigned to a device to execute once every 72 hours. Accordingly, the determined pattern may indicate that the task is to be executed every 72 hours. In another example, the task may have been assigned to a device to execute three hours after a conclusion of a music concert, each time there is a music concert. Accordingly, the determined pattern may indicate that the task is to be executed three hours after each music concert, each time there is a music concert. Further, the pattern of assigned tasks may also include an average number of devices involved in executing subtasks of the tasks. In this case, the average number of devices involved may indicate whether assistance from other devices may result in the task being executed more efficiently.

At block 806, the method 800 includes determining a future task prediction based on the pattern of assigned tasks. Continuing with the example in which the task is assigned to a device to execute every 72 hours, a future task prediction may be determined indicating that the task may be assigned to a device to be executed 72 hours after the last time the task was executed. Continuing with the other example in which the task may is assigned to be executed three hours after the conclusion of a music concert, a future task prediction may be determined indicating that the task may be assigned to a devices each time there is a musical concert. As such, a future task and a future time at which the future task is to be executed may be predicted. Further, a predicted number of devices that may be assigned to execute subtasks of the assigned task may be determined based on the average number of devices involved in executing the subtasks of the assigned task in the past. In any of these cases, one or more devices may be preemptively provided for executing the future task before the future task has been assigned to a device. Preemptively providing devices for executing the future task may include reserving mechanical or processing components of the one or more devices such that the mechanical or processing components have an idle status when the future task is to be executed.

At block 808, method 800 includes determine mechanical and processing requirements of the future task. Based on the received information associated with the assigned tasks that has been stored, device requirements for executing the predicted future task or future subtasks of the predicted future task may be determined. In one example, if the future task or future subtask of the future task involves lifting an object of a size and weight, then a device requirement for executing the future task or future subtask may include the capability of lifting an object of the size and weight. In another example, if the future task or future subtask involves processing a specific algorithm for audio signal noise reduction, then a device requirement for executing the future task or future subtask may include the capability to process the specific algorithm.

At block 810, the method 800 includes select a second device from the available devices to execute the future task. Similar to blocks 606-610 of method 600, devices available to execute the future task at the future time may first be determined based on mechanical and processing capabilities, and geographical locations of a pool of devices, for example. From the available devices, a second device may then be selected based on factors discussed previously such as an amount of usage of the available devices over time. In one example, if the future task involves a large amount of mechanical movement, a device with a lower amount of usage as compared to the other available devices may be selected and assigned the future task. In the case when more than one device is predicted to be involved in executing the future task, additional devices may also be selected based on various factors discussed previously to execute the future task or future subtasks.

At block 812, the method 800 includes send instructions to the second device to prepare for the future task. In one example, the instructions may be sent to the second device immediately after the future task has been determined and the second device has been selected to execute the future task. In another example, the instructions may be sent to the second device any time before the future time when the future task is to be executed. Further, in the case more than one device is predicted to be involved in executing the future task or subtasks, the instructions to prepare the future task or subtasks may be sent to each of the selected devices immediately after the future task and future subtasks have been determined and the devices have been selected, or any time before the future time when the future task and future subtasks are to be executed.

To prepare for the future task, a portion of the future task or future subtasks may be executed prior to the future time. For instance, if the second device is assigned a future subtask which is to be executed at a future task location different from where the second device is currently located, then a portion of the future subtask may include the second device relocating to the future task location. In this case, the future task prediction may include the future task location determined based on the stored information associated with assigned tasks. Instructions may then be provided to the second device to relocate to the future task location prior to the future time at which the future task is to be executed, thereby preparing for the future task. In the case more than one device is predicted to be involved in executing subtasks of the future task, each device may be provided instructions to relocate to the future task location prior to the future time. In some cases, future subtasks of the future task may be predicted to be executed in multiple locations. In these cases, respective devices assigned to each future subtask may accordingly be instructed to relocate to respective future subtask locations prior to the future time. As such, preparing for the future task by relocating devices to respective task or subtask location prior to when the predicted future task is to be executed may allow the devices to execute the predicted future task immediately when the assignment to execute the future task is provided to the device, without having to relocate to the task or subtask location first.

Referencing scenario A, the assigned task of robot 564 entering room 560 to execute task 552 may be stored along with other tasks assigned to robot 564 and other tasks involving entering room 560 to execute task 552. In one example, the stored tasks may indicate that a robot is assigned a task of entering room 560 at 7:30 each morning to execute task 552. Accordingly, a pattern of assigned tasks may be determined, indicating that a task may be assigned to a robot involving the robot entering room 560 each morning at 7:30 am to execute task 552. Based on the pattern of assigned tasks, a future task prediction may then be determined. In this case, the future task prediction may indicate that a robot may be assigned a task involving entering room 560 at 7:30 am the next morning to execute task 552.

Once the future task prediction has been made, mechanical and processing requirements of the future task may be made based on the stored information associated with the previously assigned tasks. In this case, the mechanical and processing requirements for entering room 560 to execute task 552 may include mechanical and processing abilities to unlock the locked door to room 560 as well as any mechanical and processing abilities required for executing task 552. After determining the mechanical and processing requirements for entering room 560 and executing task 552, the pool of robots 562, 564, 566, and 568 may then be queried and one the robots 562, 564, 566, and 568 may be selected to unlock the door of room 560 the following morning at 7:30 am, and execute task 552.

In one example, robot 566 may have been selected from among robots 562, 564, 566, and 568 to be assigned the future task. In this instance, robot 566 may be at location B, while room 560 is at location A. As such, the future task of entering room 560 and executing task 552 may further include a subtask of relocating from location B to location A. In this case, if robot 566 is idle before 7:30 am the following morning, robot 566 may execute the subtask of relocating from location B to location A prior to 7:30 am in the morning, thereby preparing for the future task. As such, robot 566 may be at the door of room 560 at location A when robot 566 receives instructions to enter room 560 and execute task 552.

Referencing scenario B, the assigned task 552 of robot 562 arranging furniture in room 560 may be stored along with other tasks assigned to robot 562 and other tasks involving arranging furniture in room 560. In one example, the stored tasks may indicate that furniture including the grand piano and the large number of chairs are to be arranged every Saturday afternoon at 4:00 pm. Based on the stored tasks, a pattern of assigned tasks may be determined indicating that furniture including the grand piano and the large number of chairs are to be arranged every Saturday afternoon at 4:00 pm. As such, a future task prediction may be determined based on the pattern of assigned tasks. In this case, the future task prediction may indicate that a robot may be assigned a task of arranging furniture in room 560 every Saturday afternoon at 4:00 pm.

Once the future task prediction has been made, mechanical and processing requirements of the future task may be made based on the stored information associated with the previously assigned tasks. In this case, the mechanical and processing requirements for arranging furniture in room 560 may include mechanical and processing capabilities to move the grand piano or the large number of chairs. After determining the mechanical and processing requirements for arranging furniture in room 560, the pool of robots 562, 564, 566, and 568 may then be queried to determine which of the pool of robots are capable of executing the future task. In this case, depending on the mechanical capabilities of each of the robots 562, 564, 566, and 568, the server may determine that at least two robots are required for moving the grand piano. Accordingly, two or more of the robots 562, 564, 566, and 568 may be selected to arrange furniture in room 560 the following Saturday at 4:00 pm.

In one example, robots 564 and 568 may have been selected from among robots 562, 564, 566, and 568 to be assigned the future task of arranging furniture. In this instance, robot 564 may be at location A, and robot 566 may be at location B. As such, the future task of arranging furniture in room 560 may further include a subtask of robot 564 relocating from location A to inside room 560, and a subtask of robot 566 relocating from location B to inside room 560. In this case, if either robot 564 or 566 are idle before 4:00 pm the following Saturday, robot 564 or robot 566 may execute the respective subtasks of relocating to inside room 560 prior to 4:00 pm the following Saturday, thereby preparing for the future task. As such, robots 564 and 566 may be inside room 560 when robot 564 or robot 566 receives instructions to arrange furniture in room 560.

5. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses further describe aspects of the present description.

The invention claimed is:

1. A method performed by a device, the method comprising:
   receiving from a first device information associated with an assigned task of the first device, wherein the assigned task involves an interaction with an environment and comprises a plurality of subtasks;
   determining whether the assigned task can be executed in less time with assistance from one or more additional devices;
   determining one or more available devices that can assist in executing the assigned task by executing at least one of the plurality of subtasks, wherein the one or more available devices include a device that is idle and that is configured to execute at least one of the plurality of subtasks;
   ranking devices from the one or more available devices based on an amount of usage over time of the one or more available devices;
   selecting a second device from among the one or more available devices based on the ranking of the one or more available devices;
   determining a first subtask from the plurality of subtasks for the second device to execute based on capabilities of the second device;
   sending to the second device instructions to execute the determined first subtask;

storing the information associated with the assigned task of the first device;

determining a pattern of assigned tasks based on the stored information and previously stored information associated with previously assigned tasks of a pool of devices; and determining a task prediction based on the pattern of assigned tasks, the task prediction estimating a future task and a future time at which the future task is to be executed.

2. The method of claim 1, wherein the amount of usage includes an amount of mechanical component usage, and wherein determining the first subtask from the plurality of subtasks for the second device to execute based on capabilities of the second device further comprises:

selecting a subtask from the plurality of subtasks for the second device to execute that has a degree of mechanical difficulty inversely proportional to the amount of mechanical component usage of the second device.

3. The method of claim 1, further comprising:

ranking devices from among the one or more available devices based on geographical proximities of the one or more available devices to the first device;

selecting the second device from among the one or more available devices based on the ranking of the geographical proximities.

4. The method of claim 1, wherein determining one or more available devices that can assist in executing the assigned task by executing at least one of the plurality of subtasks further comprises:

determining a status of mechanical actuators or processing components of devices in a pool of devices; and selecting as the one or more available devices any device of the pool of devices that has one of the mechanical actuators or the processing components in an idle status.

5. The method of claim 1, wherein determining the one or more available devices that can assist in executing the assigned task by executing at least one of the plurality of subtasks further comprises:

determining respective levels of reserve power of devices in a pool of devices; and selecting as the one or more available devices any device of the pool of devices that has a reserve power level above a predetermined threshold amount.

6. The method of claim 1, wherein determining the one or more available devices that can assist in executing the assigned task by executing at least one of the plurality of subtasks further comprises:

determining respective geographical locations of devices in a pool of devices; and selecting as the one or more available devices any device of the pool of devices capable of relocating to a subtask location where at least one of the plurality of subtasks is to be executed.

7. The method of claim 1, wherein determining the one or more available devices that can assist in executing the assigned task by executing at least one of the plurality of subtasks further comprises:

determining respective processing capabilities of devices in a pool of devices; and selecting as the one or more available devices any device of the pool of devices that is idle and is configured to execute at least one of the plurality of subtasks.

8. The method of claim 7, wherein determining the first subtask from the plurality of subtasks for the second device to execute based on capabilities of the second device further comprises:

selecting a subtask from the plurality of subtasks, wherein the selected subtask has a processing requirement met by the processing capabilities of the second device.

9. The method of claim 1, wherein determining the one or more available devices that can assist in executing the assigned task by executing at least one of the plurality of subtasks further comprises:

determining respective mechanical capabilities of devices in a pool of devices; and selecting as the one or more available devices any device of the pool of devices that has a given mechanical capability needed to perform the first subtask.

10. The method of claim 9, wherein determining the first subtask from the plurality of subtasks for the second device to execute based on capabilities of the second device further comprises:

selecting a subtask from the plurality of subtasks that has a mechanical requirement met by the respective mechanical capability of the second device.

11. The method of claim 1, wherein determining the first subtask from the plurality of subtasks for the second device to execute based on capabilities of the second device further comprises:

determining one or more previous experiences of the second device, the one or more previous experiences indicating one or more subtasks the second device has previously executed; and selecting a subtask from the plurality of subtasks for the second device to execute that is the same or similar as a given subtask that the second device has previously executed.

12. The method of claim 1, further comprising receiving from the second device one or more of information associated with whether the first subtask can be executed by the second device and information associated with whether the first subtask can be executed at all.

13. The method of claim 1, further comprising:

determining that the second device is unable to execute the first subtask when the second device has not executed the first subtask after a predetermined time;

querying a pool of devices for instructions informing how to execute the first subtask; and providing to the second device instructions informing the second device how to execute the first subtask.

14. The method of claim 1, further comprising:

determining that the second device is unable to execute the first subtask when the second device has not executed the first subtask after a predetermined time;

providing a control interface to a human operator, the control interface configured to receive input from the human operator to control the second device; and providing to the second device the input from the human operator instructing the second device to execute the first subtask.

15. The method of claim 1, further comprising:

determining mechanical and processing requirements of the future task;

selecting a third device from among the one or more available devices to execute the future task based on capabilities of the third device, wherein the capabilities of the third device meet the mechanical and computational requirements of the future task;

determining a future task location where the future task is to be executed;

sending instructions to the third device to move to the future task location prior to the future time.

16. The method of claim 1, wherein determining a first subtask from the plurality of subtasks for the second device to execute based on capabilities of the second device further comprises:

transmitting data indicating the capabilities of the second device to the first device;

causing the first device to determine the first subtask from the plurality of subtasks based on capabilities of the second device; and receiving data indicating the first subtask from the plurality of subtasks for the second device to execute.

17. A computer readable memory having stored thereon instructions executable by a computing device to cause the computing device to execute functions comprising:

receiving from a first device information associated with an assigned task of the first device, wherein the assigned task involves an interaction with an environment and comprises a plurality of subtasks;

determining whether the assigned task can be executed in less time with assistance from one or more additional devices;

determining one or more available devices that can assist in executing the assigned task by executing at least one of the plurality of subtasks, wherein the one or more available devices include a device that is idle and that is configured to execute at least one of the plurality of subtasks;

ranking devices from the one or more available devices based on an amount of usage over time of the one or more available devices;

selecting a second device from among the one or more available devices based on the ranking of the one or more available devices;

determining a first subtask from the plurality of subtasks for the second device to execute based on capabilities of the second device; and sending to the second device instructions to execute the determined first subtask;

storing the information associated with the assigned task of the first device;

determining a pattern of assigned tasks based on the stored information and previously stored information associated with previously assigned tasks of a pool of devices; and determining a task prediction based on the pattern of assigned tasks, the task prediction estimating a future task and a future time at which the future task is to be executed.

18. The computer readable memory of claim 17, wherein the instructions are further executable by the computing device to cause the computing device to execute functions comprising:

determining that the second device is unable to execute the first subtask when the second device has not executed the first subtask after a predetermined time;

providing a control interface to a human operator, the control interface configured to receive input from the human operator to control the second device; and providing to the second device the input from the human operator instructing the second device to execute the first subtask.

19. A device comprising:

a processor; and memory including instructions stored therein executable by the processor to perform functions comprising:

receiving from a first device information associated with an assigned task of the first device, wherein the assigned task involves an interaction with an environment and comprises a plurality of subtasks;

determining whether the assigned task can be executed in less time with assistance from one or more additional devices;

determining one or more available devices that can assist in executing the assigned task by executing at least one of the plurality of subtasks, wherein the one or more available devices include a device that is idle and that is configured to execute at least one of the plurality of subtasks;

ranking devices from the one or more available devices based on an amount of usage over time of the one or more available devices;

selecting a second device from among the one or more available devices based on the ranking of the one or more available devices;

determining a first subtask from the plurality of subtasks for the second device to execute based on capabilities of the second device;

sending to the second device instructions to execute the determined first subtask;

storing the information associated with the assigned task of the first device;

determining a pattern of assigned tasks based on the stored information and previously stored information associated with previously assigned tasks of a pool of devices; and determining a task prediction based on the pattern of assigned tasks, the task prediction estimating a future task and a future time at which the future task is to be executed.

20. The device of claim 19, further comprising instructions stored in the memory executable by the processor to perform functions comprising:

determining mechanical and computational requirements of the future task;

selecting a third device from among the one or more available devices to execute the future task based on capabilities of the third device, wherein the capabilities of the third device meet the mechanical and computational requirements of the future task;

determining a future task location where the future task is to be executed;

sending instructions to the third device to move to the future task location prior to the future time.

21. A system comprising:

a first device; and a second device configured to:

receive from the first device information associated with an assigned task of the first device, wherein the assigned task involves an interaction with an environment and comprises a plurality of subtasks;

determine whether the assigned task can be executed in less time with assistance from one or more additional devices;

determine one or more available devices that can assist in executing the assigned task by executing at least one of the plurality of subtasks, wherein the one or more available devices include a device that is idle and that is configured to execute at least one of the plurality of subtasks;

rank devices from the one or more available devices based on an amount of usage over time of the one or more available devices;

select a third device from among the one or more available devices based on the ranking of the one or more available devices;

determine a first subtask from the plurality of subtasks for the third device to execute based on capabilities of the third device;

cause the first device to send to the third device instructions to execute the determined first subtask;

storing the information associated with the assigned task of the first device;

determining a pattern of assigned tasks based on the stored information and previously stored information associated with previously assigned tasks of a pool of devices; and determining a task prediction based on the pattern of assigned tasks, the task prediction estimating a future task and a future time at which the future task is to be executed.

22. The system of claim 21, wherein the second device is further configured to:

determine a second subtask from the plurality of subtasks based on capabilities of the second device; and execute the second subtask from the plurality of subtasks.

* * * * *